June 17, 1930.　　　　J. I. GRUSS　　　　1,763,700
STEERING MECHANISM
Filed Jan. 18, 1929　　2 Sheets-Sheet 1
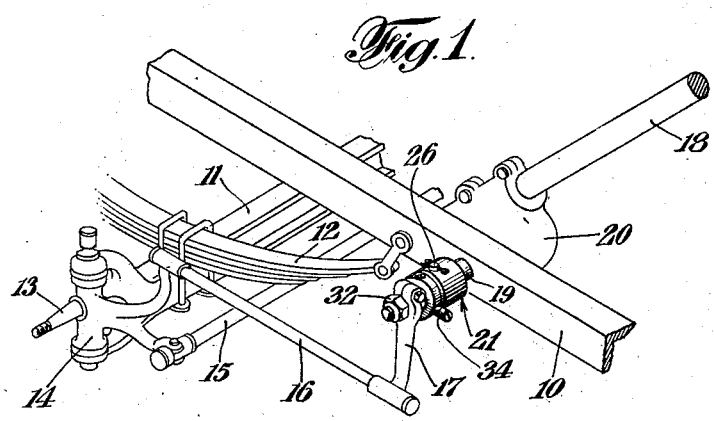
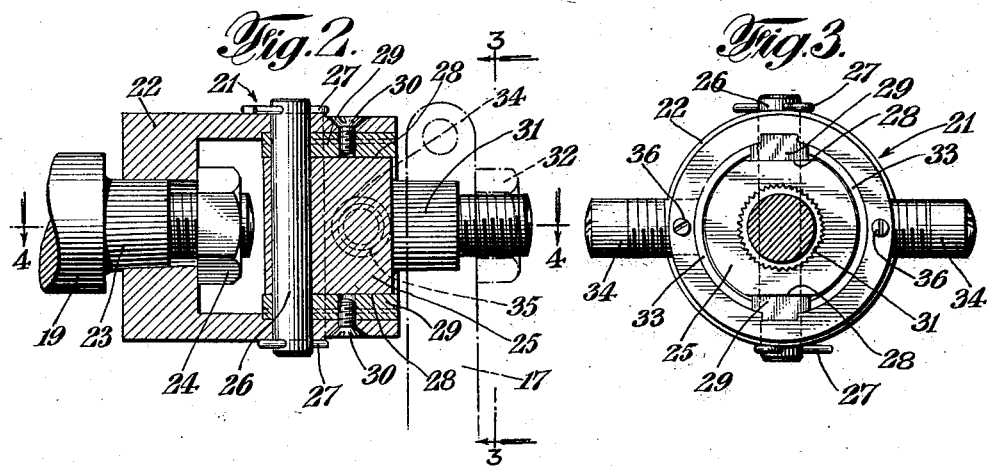
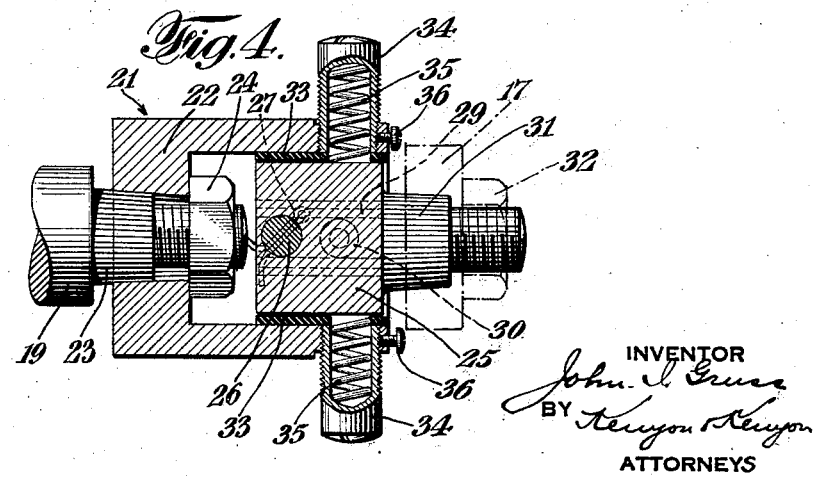
INVENTOR
John I. Gruss
BY Kenyon & Kenyon
ATTORNEYS

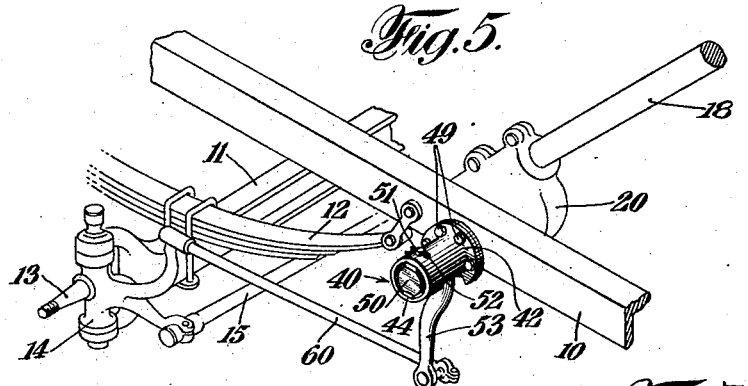

Patented June 17, 1930

1,763,700

UNITED STATES PATENT OFFICE

JOHN I. GRUSS, OF NASHUA, NEW HAMPSHIRE

STEERING MECHANISM

Application filed January 18, 1929. Serial No. 333,344.

This invention relates to improvements in steering mechanism of automotive vehicles and more particularly to apparatus associated with the steering mechanism of automotive vehicles for absorbing, checking or damping jars, etc. transmitted to the steering wheel due to irregularities in the road surface traversed and for thereby eliminating the twist of the steering wheel in the driver's hands due to such jars, etc.

In the operation of the automotive vehicles particularly over rough roads difficulty often is experienced in steering the same due to the fact that the irregularities in the road cause the steered wheels to wobble somewhat off their true course and this undesired motion is transmitted through the steering mechanism to the steering wheel and thence to the hands of the driver. Unless the steering mechanism is tight and stiff, this motion tends to set up an increasing vibration or "shimmying" of the wheels and steering gear, which designers have long sought to correct and avoid. The twist or "shimmying" of the wheel causes the steering to become difficult and often times endangers the successful operation of the vehicle.

An object of the present invention is to provide means for checking or damping the undesired motion in the steering mechanism before the same reaches the steering wheel and thereby eliminating the twist of the wheel and preventing "shimmying".

According to the present invention the undesired features set forth hereinbefore are overcome by means of a member interposed between the steering column itself and the steered wheels whereby any motion which would ordinarily be transmitted from the wheels to the steering column is checked or damped to prevent the same from reaching the steering column.

Other objects and features of the invention will become apparent by reference to the following detailed description considered in accompaniment with the drawings illustrating the same wherein Figure 1 is a perspective view of a portion of an automotive vehicle including the essential parts of the steering mechanism, Figure 2 is a vertical section of the member connecting the steered wheel with the steering column for eliminating road shocks, Figure 3 is a section taken on lines 3—3 of Fig. 2, Figure 4 is a section taken on the lines 4—4 of Fig. 2, Figure 5 is a perspective view similar to Figure 1 illustrating a modified embodiment of the invention.

Figure 6 is a view similar to Fig. 2 of the modification illustrated in Fig. 5.

Figure 7 is an end view taken in the direction indicated by the arrow 7 in Fig. 6.

Figure 8 is a section taken on the lines 8—8 of Figure 6.

Referring now to Figs. 1–4 of the drawings, 10 indicates a frame member of an automotive vehicle supported by means of an axle member 11 connected to the member 10 by means of the usual leaf spring 12. At one end of the axle 12 is the usual spindle 13 upon which a steered wheel rotates, such spindle 13 being rotatable about a vertical axis in the usual manner. The trunnion 14 to which spindle 13 is connected is in turn connected to a similar arrangement on the other end of the axle (not shown) by means of the tie bar 15. Movement of the trunnion about its vertical axis is controlled by means of the drag link 16 which is in turn connected to the usual pitman arm 17.

The improvement of the present invention has the usual steering column 18 which is connected to a steering yoke 19 through the usual gear arrangement housed within the steering housing 20. Instead of connecting steering yoke 19 directly with the pitman arm 17, the steering yoke 19 is secured to a device 21 embodying the present invention which is in turn connected to the pitman arm 17.

The device 21 consists of an outer member 22, preferably a cylinder, one end of which is hollowed out to an appreciable extent while the other end is provided with a centrally disposed opening, the surface of which is broached for the reception of the fluted end of a reduced portion 23 of the steering yoke 19. This reduced portion 23 is secured to the member 22 by means of a nut 24 which forces the member toward the shoulder of yoke 19 and due to the corresponding tongues and grooves on each of these parts, the member 22 and the yoke 19 are held firmly together so that rotation of either one of the two causes simultaneous rotation of the other.

Within the hollowed out portion of the member 22 may be positioned a second or internal member 25 of a diameter slightly less than the diameter of the hollowed out portion. The internal member 25 is held in place partly by means of a pin 26 passing through both the inner member 25 and the outer member 22, such pin being held in place by any suitable arrangements, as for example, cotter pins 27. Diametrically opposite surfaces 28 of the member 25 are planed flat as shown clearly in Fig. 3, such surfaces being adapted to bear against flat inset members 29 placed within the hollowed out portion of member 22 and held in place by means of screws 30. By means of these insets 29 as well as the pin 26, the position of the internal member with respect to the outer member is determined. The reduced end 31 of internal member 25 is fluted whereby the pitman arm 17 may be rigidly secured thereto by means of nut 32.

The interior of the hollowed out portion of the outer member 22 may be lined with some suitable resilient material 33 which acts as a cushion for movement of the inner member 25 about the axis defined by pin 26. The outer member 22 is threaded at points diametrically opposite from each other and ninety degrees (90°) on either side of the center of the inserts 29 for the reception of shells 34 within which are springs 35 adapted to bear against diametrically opposite parts of the inner member 25. These shells 24 are so arranged as to permit the same to be adjusted within the threaded openings in member 22 and set screws 36 are provided for locking the shells 34 in the desired position.

The operation and use of the device 21 is substantially as follows. The member 22 is secured to the steering yoke 19 as illustrated in Figs. 2 and 4. The inner member 25 is then positioned within the hollowed out portion of member 22 and the pin 26 inserted. The fit between the flat contacting surfaces of the inner and outer members is simply a sliding fit without appreciable vertical oscillation. The fit of the pin 26 through the inner member is sufficient to permit the turning of the inner member on the pin as an axis. The pitman arm 17 may then be connected directly to the outer end 31 of the inner member 25 by means of nut 32. When in position the member 21 is so connected to the steering yoke and to the pitman arm that the pin 26 is substantially vertical when the front wheels of the vehicle are in normal position for driving straight ahead. In this position, the inner member 25 is capable of slight horizontal oscillatory movement about the pin 26 as a vertical axis. This oscillatory movement is resisted not only by means of the cushion material 33 and the springs 35, but it also tends to cock the member 25 out of normal axial alinement with the part 25 and so to introduce a frictional resistance which checks the vibratory movement of the front wheels and at the same time dampens the shock or twist transmitted to the steering wheel. The springs 35 constantly tend to restore the parts 22 and 25 to co-axial alinement for normal steering and the tension of the springs can be varied by adjustment of position of the shells 34.

By reference to Fig. 1 it will be seen that the construction just described will serve effectively to damp or check jolts, etc. which might ordinarily be transmitted through the steering column 18 to the steering wheel. Should a wheel mounted upon spindle 13 strike an obstruction or unevenness in the road surface the result, without the present invention, would be normally to throw the front wheel to one side, such movement in turn moving the drag link 16, thereby rotating the steering yoke through the pitman arm 19 which would eventually cause a twist of the steering wheel. With the member 21 in use this uneven movement of the front wheel is largely absorbed and resisted by horizontal rotation of the inner member 25 about its vertical axis (the pin 26) so that the undesired shaking is not transmitted through the steering column 18 to the wheel (not shown).

It will be noted that the greater the shock transmitted from the front wheel thru the drag link to the member 21, the greater is the tendency to cock the inner and outer members 22 and 25 out of axial alinement with one another, and as this cocking increases it automatically produces increased frictional resistance and stiffness between the parts. I do not know whether this accounts for the success of my invention in overcoming "shimmying" but refer to it as a possible reason. The springs 35 are constantly tending to restore the members 22 and 25 to normal alinement and to remove unnecessary frictional resistance and stiffness from the steering gear so that the steering of the wheels may be accomplished as easily as in previous apparatus and without jolts or shimmying, since rotation of the steering column 18 causes rotation of the yoke 19 and of the outer member 22 and this in turn causes rotation of the inner member 25 through the pin 26 and flat contacting surfaces 28 and 29.

In Figs. 5–8 inclusive, there is illustrated a modified arrangement for producing substantially the same results as those produced by the device illustrated in Figs. 1–4 inclusive. The modification consists of a unit 40 connected between the steering yoke and the pitman arm, such unit consisting of a substantially cylindrical member 41 provided with a flange 42 extending partially therearound. A portion of one side of the cylinder 41 may be cut away as indicated at 43. Mounted within the cylinder 41 are a pair of diametrically oppositely disposed members 44 having flat inner surfaces. These members correspond to the flat members 29 shown in the device previously described. The inner end of the cylinder 41 is closed by a plate 45 conforming somewhat in shape to the flange 42 which has a portion thereof broken away as indicated partially at 43. This plate 45 is provided with a central opening which is broached for the reception of the fluted end 46 of the steering yoke 47. The steering yoke 47 is rigidly secured to the plate 45 by means of the nut 48. Plate 45 may be in turn secured to the cylinder 41 by means of bolts 49 extending through openings provided in the plate and in the flange 42.

Positioned within the cylinder 41 is an inner member 50 which, as illustrated in the drawings, may be formed, if desired, as an integral part of the usual pitman arm but which, if so desired, may be made separate therefrom and secured thereto in any desired manner. This member 50 as shown, is in substantially the shape of a cylinder having diametrically opposite faces planed smooth to permit the insertion of the member 50 between the flat surfaces of the inset members 44. This frictional engagement between the member 50 and the inset members 44 serves partially to hold the member 50 in place and in addition the member 50 is pivoted for oscillation within the cylinder 41 by means of a pin 51 extending both through the cylinder 41 and the member 50. The usual cotter keys 52 are utilized for holding the pin 51 in place. In order to damp oscillation of the member 50 and the associated pitman arm 53 about the axis defined by pin 51, a pair of springs 54 are mounted in recesses 55 cut in diametrically opposite faces of the member 50, which springs 54 have their outer terminals bearing directly against the walls of the cylinder 41.

The assembly of the device is substantially as follows. The plate 45 is secured to fluted end 46 of the steering yoke 47 and the member 50 with its pitman arm 53 is positioned within cylinder 41 and located in position by means of the pin 51. The cylinder 41 may then be secured to the plate 45 by means of the bolts 49, after which the pitman arm 53 may be secured to the drag link 60 which in turn is secured to the usual mechanism supporting the steered wheel.

The operation of the device is substantially similar to that of device 21 previously described in that shocks which would ordinarily cause the pitman arm to rotate the steering yoke are absorbed by oscillation of the member 50 within the cylinder 41. The pivoting of member 50 within member 41 and the sliding contact of the flat faces of member 50 with the inset members 44 serves to produce a frictional binding and stiffness in the member 40 when the parts are cocked out of normal alinement by road shocks on the front wheels, and this tends to absorb the shocks while the springs 54 tend to resist the cocking and to keep the member 50 always centered with respect to the outer member 41. These springs also serve to aid friction in absorbing the shocks.

By effectively eliminating jolts, etc., from being transmitted to the steering wheel, I have found that the use of the present invention makes steering noticeably easier and relieves a great deal of the strain ordinarily attendant upon passage over a road surface of uneven character.

It is to be understood that the present invention is not to be limited to the illustrated embodiment but is to be limited only by the scope of the following claims.

I claim:

1. The combination in the steering mechanism of an automotive vehicle of a member secured to the steering yoke, a second member secured to the pitman arm and pivoted for oscillation within the first member, said second member having opposite planed surfaces engaging flat surfaces within the first member, said second member being positively moved by movement of the first member.

2. The combination in the steering mechanism of an automotive vehicle of a cylindrical member secured to the steering yoke, a second cylindrical member secured to the pitman arm and pivoted for oscillation within the first member, said first member having a layer of resilient material surrounding the second member for cushioning the oscillation of the second member, said second member being positively rotated by rotation of the first member.

3. The combination in the steering mechanism of an automotive vehicle of a cylindrical member secured to the steering yoke, a second cylindrical member secured to the pitman arm and pivoted for oscillation within the first member, said first member having a layer of resilient material surrounding the second member for cushioning the oscillation of the second member, resilient members at diametrically opposite points for checking the oscillation of said second member, said second member being positively rotated by rotation of the first member.

4. The combination in the steering mechanism of an automotive vehicle of a cylindrical member secured to the steering yoke, a second cylindrical member secured to the pitman arm and pivoted for oscillation within the first member, said first member having a layer of resilient material surrounding the second member for cushioning the oscillation of the second member, resilient members extending through the walls of said first member at diametrically opposite points for checking the oscillation of said second member, said resilient members being adjustable to vary the tension against oscillation of the second member, said second member being positively rotated by rotation of the first member.

In testimony whereof, I have signed my name to this specification.

JOHN I. GRUSS.